June 3, 1969    M. G. STROMQUIST    3,447,581

EXTENSION BIT

Filed Oct. 7, 1966

*INVENTOR.*
MARTIN G. STROMQUIST
BY
Andrew F. Wilrencorn
Atty.

३,४४७,५८१
EXTENSION BIT
Martin G. Stromquist, 123 S. London Ave.,
Rockford, Ill. 61108
Filed Oct. 7, 1966, Ser. No. 585,000
Int. Cl. B27g 15/00
U.S. Cl. 145—127                    1 Claim

ABSTRACT OF THE DISCLOSURE

This extension bit has two spaced cutters in symmetrical relation to the body on opposite sides of which they are mounted, each cutter having a rack formed on one longitudinal edge portion cooperating with an adjusting screw disposed parallel thereto, each adjusting screw being independently adjustable and arranged to be independently locked by its own set screw, so that, while a balanced cutting action is obtained, one does not necessarily have to set both cutters to the same exact radius of operation.

---

This invention relates to extension bits and more particularly to extension bits having an elongated body with a screw point at one end and a shank at the other end adapted for attachment to a rotatable driver such as a brace. A cutter extends laterally from the body and is adjustable transversely with respect to the shank and body axis to different positions for different diameters of holes to be cut.

A general object of the present invention is to provide an extension bit of the above character which is more evenly balanced and faster and easier in its cutting operations.

Another object of the invention is to provide an extension bit with oppositely directed cutters which are symmetrically arranged and inclined relative to the longitudinal axis of the cutter body, the cutters being moreover independently adjustable and independently clamped, which gives certain important advantages over prior constructions.

A more detailed object of the invention is to incline cutters at an acute angle to the longitudinal axis of an extension bit and to offset axially adjusting screws for shifting the cutters transversely of the longitudinal axis of the bit.

Other objects and advantages will become apparent from the following detailed description taken in conjunction with the accompanying drawings in which.

Figure 1:
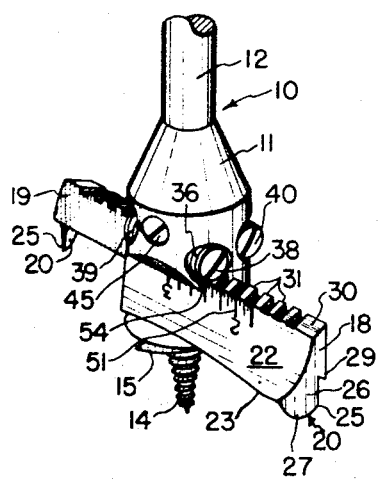
FIG. 1 is a fragmentary perspective view of an extension bit embodying the novel features of the present invention.

As shown in the drawings for purposes of illustration, the invention is embodied in an extension bit 10 having an elongated main body 11 with a shank 12 at one end adapted for attaching in a well known manner to a rotatable brace. A screw point 14 extends outwardly from the opposite end of the body and is integrally formed on the body with a downwardly tapered thread. In use, the point of the screw is placed at the center of the center hole location, the axis of the screw point being coaxial with the longitudinal axis extending through the shank and the main body. At the junction of the screw point to the main body is a larger screw thread 16 with a radially disposed leading cutting edge 15 also in the form of a spiral.

In accordance with the present invention, two cutters 18 and 19 are symmetrically disposed on the bit body to extend outwardly and downwardly from the body of the bit and to extend to an acute angle to the longitudinal axis of the bit with points or spurs 20 on the ends of the cutters engaging the work at spaced points usually but not necessarily equidistant from the center line of the body to balance the cutting forces. The use of two cutters and, more particularly, two cutters that are independently adjustable and independently clamped, expedites the cutting operation over that of prior art extension bits having only a single cutter and even those having two cutters that are not independently adjusted and clamped. The cutters are spaced on opposite sides of the bit axis and are mounted for movement transversely of the bit body to move their cutting points to positions located usually but not necessarily equidistant from the bit axis.

Figure 2:
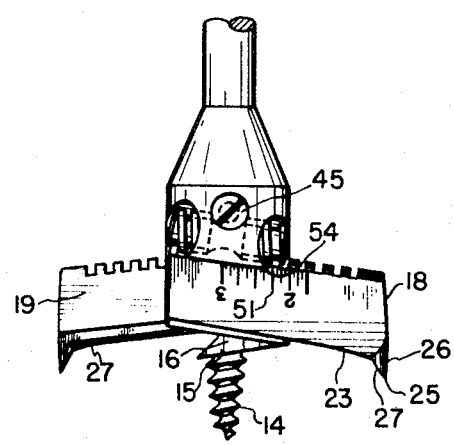
FIG. 2 is a fragmentary front elevational view of the bit.
Figure 4:
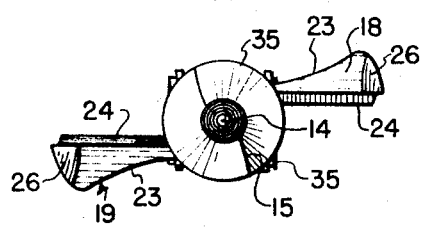
FIG. 4 is a bottom view of the bit of FIG. 2.
Figure 5:
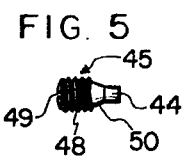
FIG. 5 is an elevational view of a lock nut.

To achieve balanced cutting actions at the points 20, the right and left cutters 18 and 19 (FIG. 1) are symmetrically arranged on the body and are formed to be mirror images of each other. Herein, each cutter is an elongated bar disposed with a vertical leading side 22 which is concave and which extends upwardly from a leading and cutting edge 23. Opposite the side 23 is a flat vertical wall 24 defining the trailing side of the cutter during rotation of the bit. The cutting edge 23 extends from the point 20 on one end of the cutter on a spiral curve, as best seen in FIG. 4, to the other end of the cutter. At the cutting point 20, the outer end wall 26 extends vertically and is generally convex in shape (FIG. 2) and extends downwardly to a point 25 defined at the lower and trailing point of the end wall 26 along its lower edge 27. The latter is curved upwardly and forwardly as seen in FIG. 1 and constitutes a leading edge by engaging the workpiece before the cutting edge 23 engages and cuts the workpiece.

To mount the cutters 18 and 19 for sliding movement, slideways are provided in the body 11 and they include lower dovetail groove surfaces 28 formed by downwardly and inwardly extending surfaces. The dovetail surfaces are in mating and sliding engagement with the respective projecting dovetail tongues 29 formed on and extending longitudinally along the vertical sidewalls 24 of the cutters 18 and 19. The upper side 30 of each cutter is in the form of an inclined surface to constitute a dovetail surface having an inclination opposite to that of the lower tongue 29.

Figure 3:
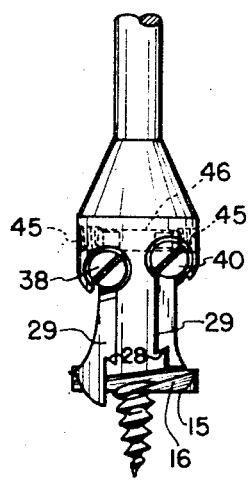
FIG. 3 is a fragmentary and elevational view of the bit of FIG. 2.
Figure 6:
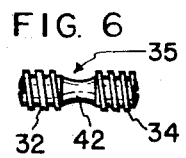
FIG. 6 is an elevational view of an adjusting screw.

Rack teeth 31 are cut in the upper inclined side 30 for meshing engagement with the spaced threads 32 and 34 (FIG. 6) on its associated adjusting screw 35 (FIG. 6). The screws 35 also serve to retain the tongues 29 locked in the grooves 28. A bore 36 is formed in the bit body and receives the right hand adjusting screw and its axis is inclined to horizontal and parallel to axis of the right hand cutter 18. A similar bore is formed in the body for the left adjusting screw and is inclined to the horizontal at the same angle as right hand bore 36. The right end 38 of the right hand adjusting screw is lower than its left hand end 39 (FIGS. 1 and 2) and the left end of the left adjusting screw is lower than its right end 40 (FIG. 1). Thus, as seen in FIG. 3, the ends 38 and 40 of the screws are off-set from each other along the longitudinal axis of the bit. The offsetting of the screws allows a considerable body of material between the screw bores thereby preventing the body from being weakened and being subjected to breaking during a twisting torque.

The adjusting screws are identical in shape and in operation and hence only the adjusting screw 35 (FIG. 6) is described in detail. The adjusting screw is generally cylindrical with the exterior threads 32 and 34 formed on opposite sides of a concave and substantially cylindrical surface 42. The latter is engaged by a cylindrical end 44 of a locking screw 45 and this end of the locking screw holds the adjusting screw against shifting axially in the bore 36 or 37 during the turning of the adjusting screw and the shifting of its associated cutter 18 or 19.

To lock the cutters 18 and 19 in an adjusted position, locking means are provided which are, herein, in the form of locking screws 45 threaded into opposite ends of a bore 46 (FIG. 3) extending through and normal to the longitudinal axis of the body. The locking screws are identical in shape and in operation and hence only one locking screw is described in detail. The locking screw is generally in the form of a set screw with an exterior thread 48 and a slot 49 on one bit for receiving the end of a screwdriver. Towards the other end, a tapered surface 50 is formed for wedging against the surface 42 of an associated adjusting screw. The bore 46 in the cylindrical body 12 is enlarged and tapped at its ends to provide screw threads for engaging the threads 48 on the respective locking screws. This bore 46 is normal to the adjusting screw bores 36 and 37 and is disposed on the upper side of these bores where they cross one another. The ends 44 of the opposite lock screws lay over the concave surfaces 42 of the cutters 18 and 19, respectively, and by threading the screws further into the body 11, the surfaces 50 may be wedged against the respective concave surfaces 42.

A scale 51 is formed along the upper edge of each cutter for cooperation with pointers 54 formed on opposite sides of the bit body and arranged concentrically and equidistantly from the longitudinal axis of the bit body. The scales are identical and each cutter is shifted usually, but not necessarily, to bring the identical mark on the scale opposite its pointer to assure that the cutting points 20 are spaced to the desired radius or radii from the axis of the bit. A typical range of hole size or diameters between cutting points is from ⅞ inches to 3 inches.

In operation, the locking screws 45 are loosened to retract the surfaces 50 from wedging engagement with the concave surfaces 42 on the adjusting screws 35. The right hand adjusting screw is turned to slide the right hand cutter 18 along the slideway in the body to indicate on the scale 51 at the pointer 54 the desired radius for the hole. The locking screw 45 is then tightened to wedge the surface 50 against the concave surface 42 of the right hand adjusting screw 35. An identical operation is performed for the left hand cutter 19, which when spaced to the desired radius from the bit axis, is also locked by its lock screw 45 from further transverse movement. With a torque applied to the shank 12 and with the tip of the screw point 14 at the center of the hole, the bit moves axially toward the work to bring the cutting points 20 and the cutting edges 23 into engagement with the work. During continued rotation of the bit in the clockwise direction as seen in FIG. 1, the cutting edges 23 on both cutters simultaneously cut the work and provide a balanced cutting, which is best appreciated where the torque is being applied by a manually operated brace. The two cutters, being independently adjustable and independently clamped may be set so that one cutter on the leading side set at a shorter radius than the final diameter will do the rough cutting and the other cutter on the trailing side, set at the full radius will do the final cutting, thereby getting smoother cut holes with less effort and considerably less wear and tear on the operating parts.

From the foregoing it will be seen that the extension bit provides increased cutting by having a plurality of cutting points in operation and is balanced by opposite cutting edges engaging the work at diammetrically opposite lines.

While a preferred embodiment has been shown and described, it will be appreciated that there is no intent to limit the invention by such a disclosure but, rather, it is intended to cover all modifications and alternative constructions falling within the spirit and scope of the invention as defined in the appended claim.

I claim:
1. An extension bit comprising, in combination, a main substantially cylindrical body extending longitudinally and having a longitudinal axis, a coaxial shank on one end of the body for connection to a rotatable driver, a screw point coaxial with and extending longitudinally from the other end of the body, a pair of similarly inclined, spaced, parallel elongated cutters symmetrically mounted in similarly inclined grooves provided in opposite sides of the body for sliding transversely of the body's longitudinal axis and in opposite directions, each cutter having a lower dovetail edge adapted for guiding as well as wedging engagement in the complementarily formed lower side of the groove receiving said cutter, cutting points on the outer free ends of the respective cutters and leading cutting edges extending along the lower sides of said cutters and inwardly from the points for cutting a hole with rotation of the bit, a rack formed on the upper edge of each cutter, an elongated screw disposed parallel to and meshed in engagement with each rack and each independently rotatable in a bore provided in said body transversely thereof to shift its associated cutter and cutting point to adjust the position of the latter radially relative to the longitudinal axis to determine the size of the hole to be made, a single through-bore provided in said body extending through and normal to the axis of said body in intersecting communicating relationship at opposite ends with the middle portions of said screw receiving bores at the top thereof, and independently operable screws threaded in the opposite ends of said through-bore and having tapered inner ends wedgingly engaging in the top of annular grooves provided in the middle portions of said first mentioned screws to force the latter downwardly so as to force the cutters downwardly into wedging engagement with the lower side of the cutter receiving grooves for locking the cutters independently against transverse movement relative to the axis of said body during a cutting operation.

References Cited

UNITED STATES PATENTS

| | | | |
|---|---|---|---|
| 1,165,854 | 12/1915 | Davis | 145—127 |
| 1,740,055 | 12/1929 | Abramson | 145—127 |
| 2,923,336 | 2/1960 | Jacobs | 145—127 |

FOREIGN PATENTS

| | | |
|---|---|---|
| 145,784 | 6/1954 | Sweden. |

ROBERT C. RIORDAN, *Primary Examiner.*

R. V. PARKER, JR., *Assistant Examiner.*